United States Patent
Fu et al.

(10) Patent No.: US 11,831,024 B2
(45) Date of Patent: Nov. 28, 2023

(54) POLYMER CURRENT COLLECTOR, PREPARATION METHOD THEREOF, AND SECONDARY BATTERY, BATTERY MODULE, BATTERY PACK, AND APPARATUS ASSOCIATED THEREWITH

(71) Applicant: Contemporary Amperex Technology Co., Limited, Ningde (CN)

(72) Inventors: Ang Fu, Ningde (CN); Chengyong Liu, Ningde (CN); Yongsheng Guo, Ningde (CN); Jiawei Fu, Ningde (CN); Qian Li, Ningde (CN); Bobing Hu, Ningde (CN); Shengyuan Huang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/810,644

(22) Filed: Jul. 5, 2022

(65) Prior Publication Data
US 2022/0367877 A1    Nov. 17, 2022

Related U.S. Application Data

(63) Continuation of application No. PCT/CN2020/107680, filed on Aug. 7, 2020.

(51) Int. Cl.
*H01M 4/66* (2006.01)
*H01M 4/80* (2006.01)
(Continued)

(52) U.S. Cl.
CPC ............. *H01M 4/667* (2013.01); *H01M 4/66* (2013.01); *H01M 4/801* (2013.01); *H01M 10/052* (2013.01); *H01M 2004/027* (2013.01)

(58) Field of Classification Search
None
See application file for complete search history.

(56) References Cited

U.S. PATENT DOCUMENTS

| | | | | |
|---|---|---|---|---|
| 2008/0118832 A1* | 5/2008 | Artman | ................. | H01M 4/808 429/209 |
| 2011/0177393 A1* | 7/2011 | Park | ..................... | C04B 35/532 252/502 |

(Continued)

FOREIGN PATENT DOCUMENTS

| | | | |
|---|---|---|---|
| CN | 1989185 A | 6/2007 | |
| CN | 103441230 A | 12/2013 | |

(Continued)

OTHER PUBLICATIONS

Li, J. et al. "A Conductive-dielectric Gradient Framework for Stable Lithium Metal Anode", Energy Storage Materials, vol. 24, Jun. 21, 2019, ISSN: 2405-8297, pp. 700-706. (Year: 2019).*

(Continued)

*Primary Examiner* — Robert S Carrico
(74) *Attorney, Agent, or Firm* — Kilpatrick Townsend & Stockton LLP

(57) ABSTRACT

This application provides a polymer current collector, a preparation method thereof, and a secondary battery, battery module, battery pack, and apparatus associated therewith. The polymer current collector provided in this application includes polymer film layers, where the polymer film layers include a first polymer film layer and a second polymer film layer, a resistivity of the first polymer film layer is denoted as $\rho 1$, a resistivity of the second polymer film layer is denoted as $\rho 2$, and the current collector satisfies $\rho 1 > \rho 2$. The polymer current collector in this application can induce to deposit of lithium metal from a low conductivity side to a high conductivity side, avoiding risks of depositing lithium (Continued)

ions on the surface of the current collector and thereby increasing cycle life of lithium metal batteries.

19 Claims, 7 Drawing Sheets

(51) Int. Cl.
  *H01M 10/052* (2010.01)
  *H01M 4/02* (2006.01)

(56) References Cited

U.S. PATENT DOCUMENTS

2020/0112030 A1* 4/2020 Panat ................ H01M 4/38
2020/0127294 A1* 4/2020 Guo ................ H01M 4/762

FOREIGN PATENT DOCUMENTS

| CN | 106898778 A | 6/2017 |
| CN | 110233223 A | 9/2019 |
| CN | 110660969 A | 1/2020 |
| CN | 110690420 A | 1/2020 |
| CN | 111954943 A | 11/2020 |
| KR | 1020160118979 A | 10/2016 |
| WO | 2020091453 A1 | 5/2020 |

OTHER PUBLICATIONS

International Search Report received in PCT Application PCT/CN2020/107680 dated May 8, 2021.

Liang. Z. et al. "Polymer Nanofiber-Guided Uniform Lithium Deposition for Battery Electrodes", Nano Lett., vol. 15, Mar. 30, 2015, ISSN: 1530-6984, pp. 2910-2916.

Hong, S.H. et al. "Electrical Conductivity Gradient Based on Heterofibrous Scaffolds for Stable Lithium-Metal Batteries", Adv. Funct. Mater, vol. 30, Feb. 11, 2020, ISSN: 1616-301X, pp. 1-10.

Li, J. et al. "A Conductive-dielectric Gradient Framework for Stable Lithium Metal Anode", Energy Storage Material, vol. 24, Jun. 21, 2019, ISSN: 2405-8297, pp. 700-706.

* cited by examiner

POLYMER CURRENT COLLECTOR, PREPARATION METHOD THEREOF, AND SECONDARY BATTERY, BATTERY MODULE, BATTERY PACK, AND APPARATUS ASSOCIATED THEREWITH

CROSS-REFERENCE TO RELATED APPLICATIONS

This application is a continuation of International Application PCT/CN2020/107680, filed on Aug. 7, 2020 and entitled " POLYMER CURRENT COLLECTOR, PREPARATION METHOD THEREOF, AND SECONDARY BATTERY, BATTERY MODULE, BATTERY PACK, AND APPARATUS ASSOCIATED THEREWITH", which is incorporated herein by reference in its entirety.

TECHNICAL FIELD

This application relates to the field of battery technologies, and in particular, to a polymer current collector, a preparation method thereof, and a secondary battery, battery module, battery pack, and apparatus associated therewith.

BACKGROUND

Metal lithium (Li) has received widespread attention and is researched in the industry due to advantages such as extremely high theoretical specific capacity (3860 mAh $g^{-1}$), lowest reduction potential (−3.04 V vs. normal hydrogen electrode), smallest atomic radius, and low density (0.534 g cm $^{-3}$). However, in a deposition process of lithium metal, lithium dendrites are inevitably produced, which greatly affect safety performance and electrochemical performance of lithium metal batteries, constraining their rapid popularization.

Therefore, it is necessary to provide a technical solution to improve safety and cycle life of lithium metal batteries.

SUMMARY

To resolve the technical problem existing in the conventional technology, this application is intended to provide a polymer current collector for lithium metal batteries, a preparation method of such polymer current collector, a secondary battery including such polymer current collector, and a battery module, battery pack, and apparatus associated therewith. The polymer current collector effectively avoids risks of depositing lithium ions on the surface of the current collector, increasing cycle life of the lithium metal batteries.

To achieve the foregoing objective, the following technical solutions are used in this application.

According to a first aspect of this application, a polymer current collector is provided. The polymer current collector includes polymer film layers, where the polymer film layers include a first polymer film layer and a second polymer film layer, a resistivity of the first polymer film layer is denoted as $\rho 1$, a resistivity of the second polymer film layer is denoted as $\rho 2$, and the current collector satisfies $\rho 1 > \rho 2$.

According to a second aspect of this application, a preparation method of the polymer current collector in the first aspect is provided. The method includes the following steps:
  S1: providing two or more than two polymer films having different resistivities; and
  S2: pressing the polymer films having different resistivities in S1 in descending or ascending order of resistivities to obtain the polymer current collector;
where the polymer current collector includes polymer film layers, the polymer film layers include a first polymer film layer and a second polymer film layer, a resistivity of the first polymer film layer is denoted as $\rho 1$, a resistivity of the second polymer film layer is denoted as $\rho 2$, and the current collector satisfies $\rho 1 > \rho 2$.

According to a third aspect of this application, a secondary battery is provided. The secondary battery includes a negative electrode plate, where the negative electrode plate includes the polymer current collector in the first aspect of this application or a polymer current collector prepared by using the method in the second aspect of this application.

According to a fourth aspect of this application, a battery module is provided. The battery module includes the secondary battery in the third aspect of this application.

According to a fifth aspect of this application, a battery pack is provided. The battery pack includes the battery module in the fourth aspect of this application.

According to a sixth aspect of this application, an apparatus is provided. The apparatus includes at least one of the secondary battery in the third aspect of this application, the battery module in the fourth aspect of this application, or the battery pack in the fifth aspect of this application.

This application has the following beneficial effects:

The polymer current collector in this application has a conductivity gradient, can induce deposition of lithium metal from a low conductivity side to a high conductivity side, avoiding risks of depositing lithium ions on the surface of the current collector and thereby increasing cycle life of lithium metal batteries.

Figure 1:
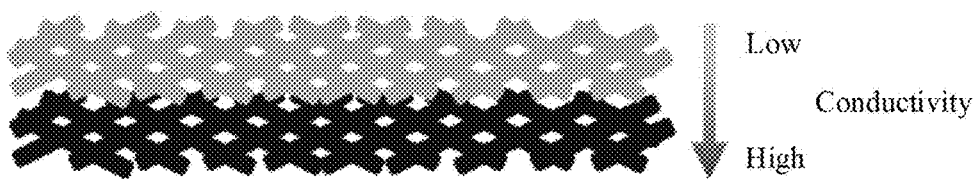
FIG. 1 is a schematic structural diagram of a polymer current collector according to an embodiment of this application.
Figure 2:
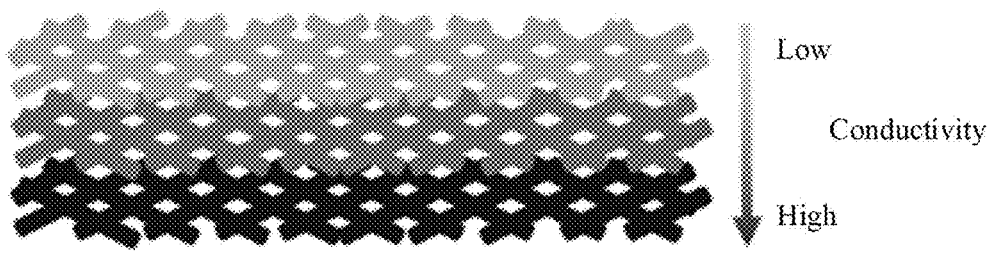
FIG. 2 is a schematic structural diagram of a polymer current collector according to another embodiment of this application.
Figure 3:
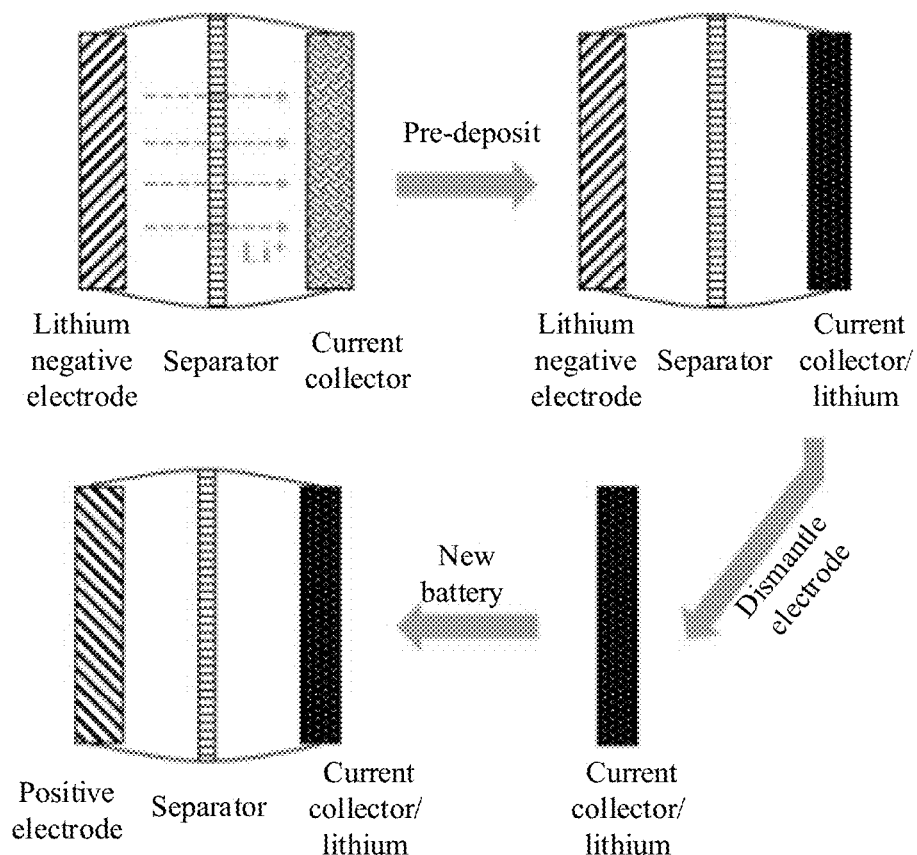
FIG. 3 is a schematic diagram of an electrode plate according to an embodiment of this application.
Figure 4:
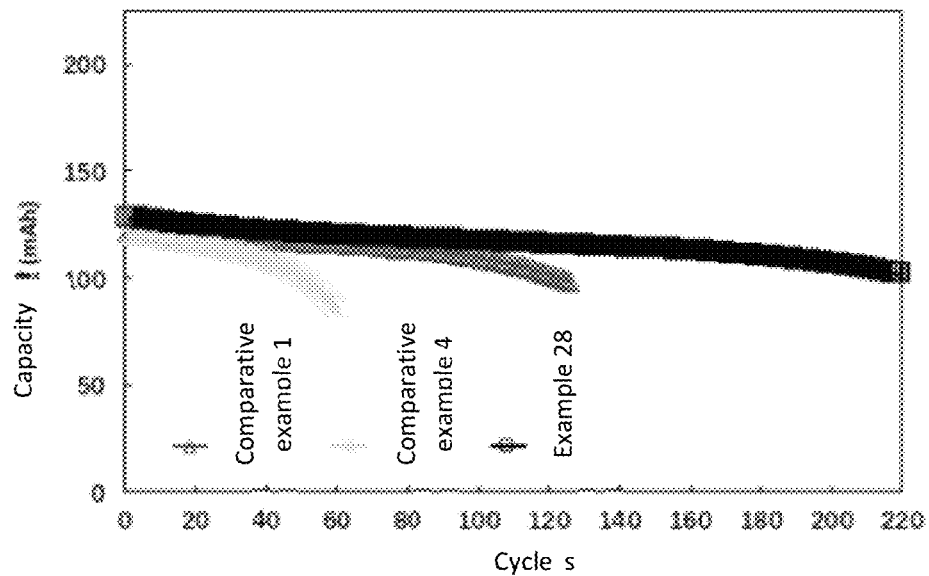
FIG. 4 shows cycling performance of lithium metal batteries with a polymer current collector according to an embodiment of this application.

REFERENCE SIGNS 1. battery pack;
2. upper box body;
3. lower box body;
4. battery module;
5. secondary battery;
51. housing;
52. electrode assembly; and
53. cover plate.

DETAILED DESCRIPTION OF EMBODIMENTS

The following further describes this application with reference to embodiments. It should be understood that these specific embodiments are merely intended to illustrate this application but not to limit the scope of this application.

For brevity, this specification specifically discloses only some numerical ranges. However, any lower limit may be combined with any upper limit to form a range not expressly recorded; any lower limit may be combined with any other lower limit to form a range not expressly recorded; and any upper limit may be combined with any other upper limit to form a range not expressly recorded. In addition, each separately disclosed point or individual value may itself be a lower limit or upper limit to be combined with any other point or individual value or combined with any other lower limit or upper limit to form a range not expressly recorded.

In the descriptions of this specification, it should be noted that "more than" or "less than" is inclusive of the present number and that "more" in "one or more" means two or more than two, unless otherwise specified.

Unless otherwise specified, terms used in this application have well-known meanings generally understood by persons skilled in the art. Unless otherwise specified, numerical values of parameters mentioned in this application may be measured by using various measurement methods commonly used in the art (for example, testing may be performed by using the methods provided in the examples of this application).

The following describes in detail a polymer current collector in a first aspect of this application, a method in a second aspect of this application for preparing the polymer current collector in the first aspect of this application, a secondary battery in a third aspect of this application which uses the polymer current collector in the first aspect of this application or a polymer current collector prepared by using the preparation method in the second aspect of this application, a battery module in a fourth aspect of this application which uses the secondary battery in the third aspect of this application, a battery pack in a fifth aspect of this application which uses the battery module in the fourth aspect of this application, and an apparatus in a sixth aspect of this application which uses the secondary battery in the third aspect of this application, the battery module in the fourth aspect of this application, or the battery pack in the fifth aspect of this application.

Polymer Current Collector

According to the polymer current collector in the first aspect of this application, the polymer current collector includes polymer film layers, where the polymer film layers include a first polymer film layer and a second polymer film layer, a resistivity of the first polymer film layer is denoted as $\rho_1$, a resistivity of the second polymer film layer is denoted as $\rho_2$, and the current collector satisfies $\rho_1 > \rho_2$.

The inventors of this application have found that when $\rho_1 > \rho_2$, meaning when the polymer current collector has a conductivity gradient, lithium metal can be induced to deposit from a low conductivity side to a high conductivity side, effectively avoiding risks of depositing lithium ions on the surface of the current collector and thereby increasing cycle life of lithium metal batteries.

A $\rho_1/\rho_2$ ratio may affect a conductivity difference between two adjacent polymer film layers. When $\rho_1/\rho_2 \geq 40$, lithium metal can be induced to deposit from a low conductivity side to a high conductivity side, increasing cycle life of lithium metal batteries. A smaller ratio means a smaller conductivity difference. A small conductivity difference makes it difficult to induce lithium ions to evenly migrate from the first layer to the second layer spontaneously, so it is hard for lithium ions to fill the entire polymer evenly and compactly. When a skeleton conductivity difference is large, the first layer polymer skeleton is substantially non-conductive, and a large amount of dead lithium is easily formed inside the non-conductive polymer skeleton when lithium metal is released from the polymer skeleton. This is not conducive to uniform release of lithium metal. Therefore, the $\rho_1/\rho_2$ ratio is controlled to be 50 to 60000.

According to some embodiments of this application, the $\rho_1/\rho_2$ ratio is 500 to 20000.

According to some embodiments of this application, the $\rho_1/\rho_2$ ratio is 500 to 5000, 500 to 3000, 500 to 1000, 550 to 900, 550 to 800, 600 to 700, 640 to 850, 600 to 2000, or 600 to 4000.

According to some embodiments of this application, $\rho_1$ is $10^2$ Ω·cm to $10^9$ Ω·cm.

According to some embodiments of this application, $\rho_1$ is $10^3$ Ω·cm to $10^6$ Ω·cm.

According to some embodiments of this application, $\rho_1$ is 5000 Ω·cm to 10000 Ω·cm, 15000 Ω·cm to 20000 Ω·cm, 25000 Ω·cm to 30000 Ω·cm, 35000 Ω·cm to 40000 Ω·cm, 45000 Ω·cm to 50000 Ω·cm, or 55000 Ω·cm to 60000 Ω·cm.

According to some embodiments of this application, $\rho_2$ is 10 Ω·cm to $10^4$ Ω·cm.

According to some embodiments of this application, $\rho_2$ is 10 Ω·cm to 1000 Ω·cm.

According to some embodiments of this application, $\rho_2$ is 10 Ω·cm to 50 Ω·cm, 75 Ω·cm to 200 Ω·cm, 250 Ω·cm to 400 Ω·cm, 450 Ω·cm to 600 Ω·cm, 650 Ω·cm to 700 Ω·cm, or 750 Ω·cm to 1000 Ω·cm.

The inventors of this application have found that with gradual increasing of a sintering (carbonizing) temperature, an N or O content in a polymer is gradually decreasing, which improves conductivity of the polymer. Therefore, variations of C/N or C/O in the polymer film layers can be monitored to indirectly determine a conductivity difference between different layers of the polymer.

The variation of C/N or C/O in this application refers to a difference value between a C/N or C/O value before a polymer film is baked and a C/N or C/O value after the polymer film is baked.

According to some embodiments of this application, in the first polymer film layer, a variation of C/N is 0.1 to 10.

According to some embodiments of this application, in the first polymer film layer, the variation of C/N is 0.2 to 3.

According to some embodiments of this application, in the first polymer film layer, a variation of C/O is 0.1 to 10.

According to some embodiments of this application, in the first polymer film layer, the variation of C/O is 0.2 to 3.

According to some embodiments of this application, in the second polymer film layer, a variation of C/N is 0.1 to 15.

According to some embodiments of this application, in the second polymer film layer, the variation of C/N is 0.2 to 5.

According to some embodiments of this application, in the second polymer film layer, a variation of C/O is 0.1 to 15.

According to some embodiments of this application, in the second polymer film layer, the variation of C/O is 0.2 to 5.

The inventors of this application have found that in the polymer current collector in this application, more polymer film layers having different resistivities allow for better final battery performance. On a premise of satisfying practical application thickness of the polymer current collector, a quantity of the polymer film layers is greater than 2, preferably, greater than or equal to 3, and more preferably, being 3 to 5.

According to some embodiments of this application, the polymer current collector further includes a third polymer film layer, the second polymer film layer is disposed between the third polymer film layer and the first polymer film layer, a resistivity of the third polymer film layer is denoted as $\rho 3$, and the current collector further satisfies $\rho 2 > \rho 3$.

The inventors in this application have found that when the polymer current collector includes three or more polymer film layers, a multi-level conductivity gradient can be formed inside the current collector, providing more driving force for lithium metal to deposit from inside to outside. This is conductive to more uniform and compact deposition of lithium metal.

According to some embodiments of this application, a $\rho 2/\rho 3$ ratio is 20 to 1000. A smaller ratio means a smaller conductivity difference. A small conductivity difference makes it difficult to induce lithium ions to evenly migrate from the second layer to the third layer spontaneously, so it is hard for lithium ions to fill the entire polymer evenly and compactly. When a skeleton conductivity difference is large, the second layer polymer skeleton is substantially non-conductive, and a large amount of dead lithium is easily formed inside the non-conductive polymer skeleton when lithium metal is released from the polymer skeleton. This is not conducive to uniform release of lithium metal.

According to some embodiments of this application, the $\rho 2/\rho 3$ ratio is 20 to 500.

According to some embodiments of this application, the $\rho 2/\rho 3$ ratio is 20 to 40, 23 to 40, 25 to 35, 25 to 30, 26 to 50, or 26 to 100.

According to some embodiments of this application, $\rho 3$ is 1 $\Omega\cdot$cm to 500 $\Omega\cdot$cm.

According to some embodiments of this application, $\rho 3$ is 10 $\Omega\cdot$cm to 100 $\Omega\cdot$cm.

According to some embodiments of this application, in the third polymer film layer, a variation of C/N is 0.3 to 20.

According to some embodiments of this application, in the third polymer film layer, the variation of C/N is 1 to 5.

According to some embodiments of this application, in the third polymer film layer, a variation of C/O is 0.3 to 20.

According to some embodiments of this application, in the third polymer film layer, the variation of C/O is 0.3 to 2.

According to some embodiments of this application, the polymer film layers of the polymer current collector include a same polymer.

According to some embodiments of this application, the polymer current collector is a porous structure. With the polymer current collector being a porous structure, the porous structure can not only provide a deposition skeleton for lithium metal, which is conductive to reducing volume swelling of lithium metal, but also increase deposition sites for lithium metal, which is conductive to uniform deposition of lithium metal.

The inventors of this application have found that thickness of the polymer film layer has immediate effect on strength of the current collector and energy density of a later assembled battery. A film layer being too thin affects strength of the current collector and is prone to cracks during battery assembly and later cycling. A film layer too thick increases weight of the current collector and also requires more electrolyte solution to infiltrate the current collector, which is not conductive to overall energy density of the battery. Further, a film too thick greatly increases a diffusion distance of lithium ions, which is not conducive to uniform deposition of lithium metal. Therefore, thickness of a polymer film layer is controlled to be greater than or equal to 1 μm, and preferably, being 5 μm to 100 μm.

According to some embodiments of this application, thickness of the first polymer film layer is greater than or equal to 1 μm.

According to some embodiments of this application, thickness of the first polymer film layer is 5 μm to 100 μm.

According to some embodiments of this application, thickness of the first polymer film layer is 10 μm to 50 μm.

According to some embodiments of this application, thickness of the second polymer film layer is greater than or equal to 1 μm.

According to some embodiments of this application, thickness of the second polymer film layer is 5 μm to 100 μm.

According to some embodiments of this application, thickness of the second polymer film layer is 10 μm to 50 μm.

According to some embodiments of this application, thickness of the third polymer film layer is greater than or equal to 1 μm.

According to some embodiments of this application, thickness of the third polymer film layer is 5 μm to 100 μm.

According to some embodiments of this application, thickness of the third polymer film layer is 10 μm to 50 μm.

Preparation Method of Polymer Current Collector

According to a second aspect, this application provides a preparation method of the polymer current collector in the first aspect. The method includes the following steps:
  S1: providing two or more than two polymer films having different resistivities; and
  S2: pressing the polymer films having different resistivities in S1 in descending or ascending order of resistivities to obtain the polymer current collector.

According to some embodiments of this application, a preparation method of the polymer films includes the following steps:
  (1) providing two or more than two polymer film precursors including a same polymer raw material; and
  (2) subjecting the polymer film precursors in (1) to sintering, where the polymer film precursors each are sintered at different temperatures to obtain polymer films having different resistivities.

According to some embodiments of this application, the polymer film is at least one of a film made from a porous polymer raw material and a film made from polymer raw material solution through electrospinning According to some embodiments of this application, a preparation method of the polymer film precursors includes the following steps:
  (a) preparing a polymer raw material solution; and
  (b) performing electrospinning on the polymer raw material solution in (a) to form two or more than two polymer film precursors.

The inventors of this application have found that electrospinning allows a wide selection range of polymer raw materials and control of the porosity and strength of a skeleton. Therefore, in this application, the electrospinning manner is preferably used to prepare the polymer film precursors.

According to some embodiments of this application, the polymer raw material may include one or more of nitrile polymer, alcohol polymer, cellulose polymer, sulfone polymer, amine polymer, ester polymer, ketone polymer, melamine foam, and cotton fiber.

According to some embodiments of this application, the polymer raw material may include one or more of polyacrylonitrile, polyvinyl alcohol, carboxymethyl cellulose, and poly sulfuriamide.

According to some embodiments of this application, a relative molecular mass of the polymer raw material is 500000 to 2000000.

According to some embodiments of this application, the electrospinning includes spaying the polymer raw material solution evenly on a metal foil under a high voltage to form a polymer film precursor.

According to some embodiments of this application, the sintering is performed in an inert atmosphere, and preferably, the inert atmosphere is made of commonly-used inert gas such as nitrogen or argon.

The inventors of this application have found that the sintering temperature can be used to control conductivity of the current collector, and with gradual increasing of the sintering (carbonizing) temperature, an N or O content in the polymer is gradually decreasing, which improves conductivity of the polymer.

According to some embodiments of this application, the sintering temperature is 200° C. to 2000° C., preferably, 300° C. to 1000° C., and more preferably, 400° C. to 800° C.

According to some embodiments of this application, a sintering duration is 0.5 hours to 5 hours, and preferably, 1 hour to 3 hours.

According to some embodiments of this application, the pressing is one or more of rolling, flat pressing, hot pressing, and cold pressing.

The inventors of this application have found that adding surfactant, for example, polyvinylpyrrolidone, in the preparation process of a polymer film, such that the polymer is fully dispersed is conductive to forming a polymer film with uniform pore sizes. Therefore, lithium metal can be evenly transported in the polymer film, avoiding uneven deposition concentration, which in turn avoids production of lithium dendrites. Preferably, a relative molecular mass of the polyvinylpyrrolidone is 50000 to 250000, for example, 100000 to 150000. Preferably, an amount of the polyvinylpyrrolidone added is 5 wt % to 15 wt % of the polymer solution.

Secondary Battery

A third aspect of this application provides a secondary battery. The secondary battery includes a positive electrode plate, a negative electrode plate, a separator, and an electrolyte. In a battery charging/discharging process, active ions are intercalated and deintercalated back and forth between the positive electrode plate and the negative electrode plate. The electrolyte conducts ions between the positive electrode plate and the negative electrode plate.

[Negative Electrode Plate]

In the secondary battery in this application, the negative electrode plate includes the polymer current collector in the first aspect or a polymer current collector prepared by using the method in the second aspect.

In the secondary battery in this application, when the negative electrode plate selects the polymer current collector, the first polymer film layer is closer to the separator in the battery than the second polymer film layer.

According to some embodiments of this application, the negative electrode plate includes only the polymer current collector.

According to some embodiments of this application, the negative electrode plate is a polymer current collector—lithium composite negative electrode, and lithium metal is deposited inside the polymer current collector.

According to some embodiments of this application, the negative electrode plate is a polymer current collector—lithium composite negative electrode, and the polymer current collector is disposed on a surface of the lithium metal.

In the secondary battery in this application, the negative electrode plate does not exclude other additional functional layers than the polymer current collector.

[Positive Electrode Plate]

In the secondary battery in this application, the positive electrode plate includes a positive-electrode current collector and a positive-electrode film layer that is provided on at least one surface of the positive-electrode current collector and that includes a positive-electrode active material.

It can be understood that the positive-electrode current collector includes two back-to-back surfaces in a thickness direction of the positive-electrode current collector, and the positive-electrode film layer may be stacked on either or both of the two back-to-back surfaces of the positive-electrode current collector.

In the secondary battery in this application, the positive-electrode current collector may use a metal foil or a composite current collector. For example, an aluminum foil may be used. The composite current collector may be formed by forming a metal material (copper, copper alloy, nickel, nickel alloy, titanium, titanium alloy, silver, silver alloy, or the like) on a polymer matrix.

In the secondary battery in this application, the positive-electrode active material may be a positive-electrode active material for secondary batteries that is well known in the art. For example, the positive-electrode active material may include one or more of lithium-containing transition metal oxides, lithium-containing phosphates with an olivine-type structure, and respective modified compounds thereof. The lithium-containing transition metal oxides, for example, may include but are not limited to one or more of lithium cobalt oxides, lithium nickel oxides, lithium manganese oxides, lithium nickel cobalt oxides, lithium manganese cobalt oxides, lithium nickel manganese oxides, lithium nickel cobalt manganese oxides, lithium nickel cobalt aluminum oxides, and modified compounds thereof. The lithium-containing phosphates with an olivine-type structure, for example, may include but are not limited to one or more of lithium iron phosphate, composite materials of lithium iron phosphate and carbon, lithium manganese phosphate, composite materials of lithium manganese phosphate and carbon, lithium iron manganese phosphate, composite materials of lithium iron manganese phosphate and carbon, and modified compounds thereof. This application is not limited to these materials, and other conventionally well known materials that can be used as a positive-electrode active material for secondary batteries may also be used.

In some preferred embodiments, to further improve energy density of the battery, the positive-electrode active material may include one or more of lithium-containing transition metal oxide in formula 1 and modified compounds thereof.

$$Li_aNi_bCo_cM_dO_eA_f \qquad \text{formula 1}$$

In formula 1, $0.8 \leq a \leq 1.2$, $0.5 \leq b < 1$, $0 < c < 1$, $0 < d < 1$, $1 \leq e \leq 2$, and $0 \leq f \leq 1$. M is one or more of Mn, Al, Zr, Zn, Cu, Cr, Mg, Fe, V, Ti, and B. A is one or more of N, F, S, and Cl.

In this application, the modified compounds of the foregoing materials may be obtained through modification by doping and/or surface coating the materials.

[Electrolyte]

The electrolyte conducts ions between the positive electrode plate and the negative electrode plate. The electrolyte is not limited to any specific type in this application, and may be selected as required. For example, the electrolyte may be at least one of a solid electrolyte and a liquid electrolyte (that is, an electrolyte solution).

In some embodiments, the electrolyte is an electrolyte solution. The electrolyte solution includes an electrolytic salt and a solvent.

In some embodiments, the electrolytic salt may be one or more of $LiPF_6$ (lithium hexafluorophosphate), $LiBF_4$ (lithium tetrafluoroborate), $LiClO_4$ (lithium perchlorate), $LiAsF_6$ (lithium hexafluoroborate), LiFSI (lithium bis(fluorosulfonyl)imide), LiTFSI (lithium bistrifluoromethanesulfonimide), LiTFS (lithium trifluoromethanesulfonat), LiDFOB (lithium difluorooxalatoborate), LiBOB (lithium bisoxalatoborate), $LiPO_2F_2$ (lithium difluorophosphate), LiDFOP (lithium difluorophosphate), and LiTFOP (lithium tetrafluoro oxalate phosphate).

In some embodiments, the solvent may be one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methylmethylformate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), tetramethylenesulfone (SF), methyl sulfone (MSM), ethyl methyl sulfone (EMS), and diethyl sulfone (ESE).

In some embodiments, the electrolyte solution may further optionally include an additive. For example, the additive may include a negative-electrode film-forming additive, or may include a positive-electrode film-forming additive, or may include additives capable of improving some performance of a battery, for example, an additive for improving over-charge performance of the battery, an additive for improving high-temperature performance of the battery, and an additive for improving low-temperature performance of the battery.

[Separator]

A separator is further included in secondary batteries using an electrolyte solution and some secondary batteries using a solid electrolyte. The separator is disposed between the positive electrode plate and the negative electrode plate to provide separation. The separator is not limited to any specific type in this application, and may be any commonly known porous separator with good chemical stability and mechanical stability.

In some embodiments, a material of the separator may be one or more of glass fiber, non-woven fabric, polyethylene, polypropylene, and polyvinylidene fluoride. The separator may be a single-layer thin film or a multi-layer composite thin film. In a case that the separator is a multi-layer composite thin film, all layers may be made of same or different materials.

In some embodiments, the positive electrode plate, negative electrode plate, and separator may be made into an electrode assembly through winding or lamination.

In some embodiments, the secondary battery may include an outer package. The outer package is used for packaging the electrode assembly and the electrolyte.

In some embodiments, the outer package of the secondary battery may be a hard shell, for example, a hard plastic shell, an aluminum shell, or a steel shell. The outer package of the secondary battery may alternatively be a soft pack, for example, a soft pouch. A material of the soft pack may be plastic, for example, one or more of polypropylene (PP), polybutylene terephthalate (PBT), and polybutylene succinate (PBS).

Figure 5:
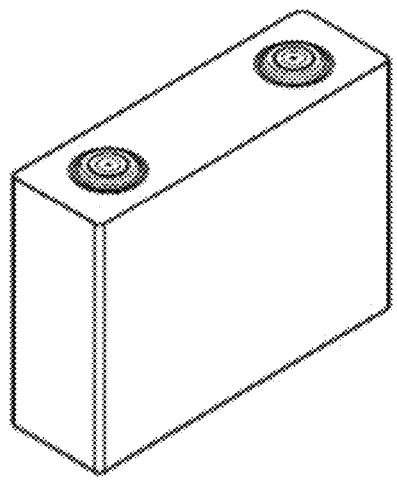
FIG. 5 is a schematic diagram of an embodiment of a secondary battery in this application.

The secondary battery is not limited to a particular shape in this application, and may be of a cylindrical, rectangular, or any other shapes. FIG. 5 shows a secondary battery 5 of a rectangular structure as an example.

Figure 6:
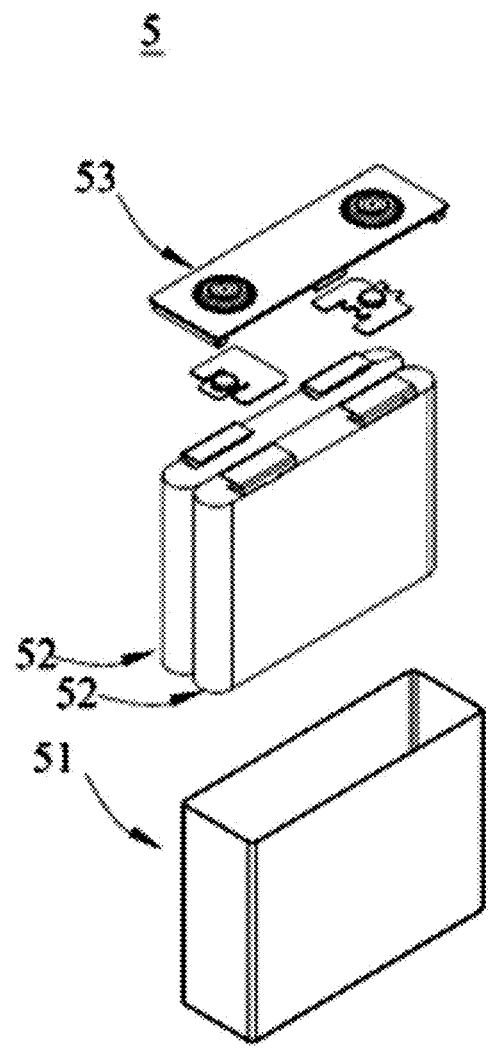
FIG. 6 is a schematic exploded view of an embodiment of a secondary battery in this application.

In some embodiments, referring to FIG. 6, the outer package may include a housing 51 and a cover plate 53. The housing 51 may include a base plate and side plates connected onto the base plate, and the base plate and the side plates enclose an accommodating cavity. The housing 51 has an opening communicating with the accommodating cavity, and the cover plate 53 can cover the opening to close the accommodating cavity. A positive electrode plate, a negative electrode plate, and a separator may be made into an electrode assembly 52 through winding or lamination. The electrode assembly 52 is packaged in the accommodating cavity. The electrolyte solution is infiltrated into the electrode assembly 52. There may be one or more electrode assemblies 52 in the secondary battery 5, and the quantity may be adjusted as required.

Preparation Method of Secondary Battery

This application further provides a preparation method of a secondary battery. The method includes preparing a negative electrode plate of the battery in the following steps:

assembling the obtained polymer current collector and lithium metal into a half battery, with a polymer fiber film with a lowest resistivity attached to a negative electrode and lithium metal pre-deposited in cavities of the porous current collector. Finally, the current collector—lithium composite negative electrode is taken out of the half battery.

According to some embodiments of this application, the polymer current collector may directly serve as the negative electrode to match a positive electrode plate.

According to some embodiments of this application, the negative electrode plate is obtained by depositing lithium metal to inside the polymer current collector.

According to some embodiments of this application, the negative electrode plate is obtained by disposing the polymer current collector on a surface of lithium metal.

Except for the preparation method of the negative electrode plate in this application, other construction and preparation methods for the secondary battery in this application are well-known. For example, the positive electrode plate in this application may be prepared in the following method: mixing a positive-electrode active material and optionally a conductive agent (for example, a carbon material such as carbon black) and a binder (for example, PVDF), dispersing and stirring them in a solvent (for example, NMP) to produce a uniform mixture, and applying the mixture evenly on a positive-electrode current collector, followed by drying, to obtain the positive electrode plate. A metal foil such as an aluminum foil or a material such as a porous metal plate may be used as the positive-electrode current collector. In preparing the positive electrode plate, punching, laser die-cutting, or the like may be applied on uncoated regions of the positive-electrode current collector to obtain a positive electrode plate.

Finally, the positive electrode plate, the separator, and the negative electrode plate may be stacked in order, so that the separator is sandwiched between the positive-electrode and negative electrode plates to provide separation. Then, the stack is wound (or laminated) to obtain an electrode assembly. The electrode assembly is placed in an outer package which is filled with electrolyte solution after drying, followed by processes including vacuum packaging, standing, formation, and shaping to obtain a secondary battery.

Battery Module

A fourth aspect of this application provides a battery module. The battery module includes the secondary battery in the third aspect of this application. The battery module in this application uses the secondary battery provided by this application, and therefore has at least the same advantages as the secondary battery.

The battery module in this application may include a plurality of secondary batteries. A specific quantity may be adjusted based on use and capacity of the battery module.

Figure 7:
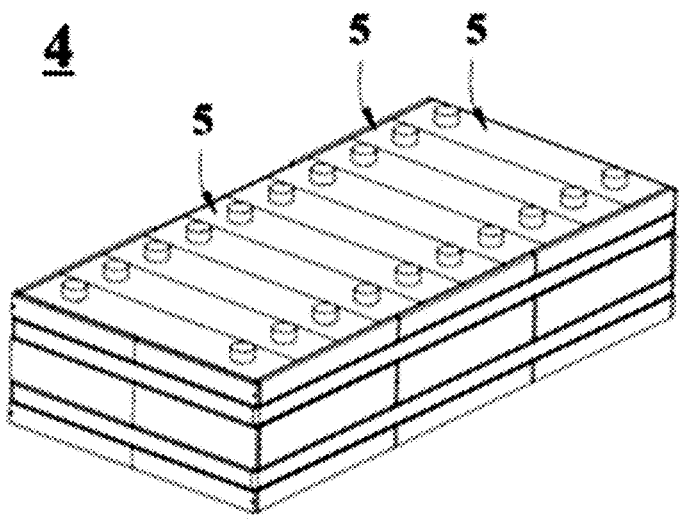
FIG. 7 is a schematic diagram of an embodiment of a battery module.

FIG. 7 shows a battery module 4 used as an example. Referring to FIG. 7, in the battery module 4, a plurality of secondary batteries 5 may be sequentially arranged in a length direction of the battery module 4. Certainly, the secondary batteries may alternatively be arranged in any other manner Further, the plurality of secondary batteries 5 may be fastened by using fasteners.

Optionally, the battery module 4 may further include a housing with an accommodating space, and the plurality of secondary batteries 5 are accommodated in the accommodating space.

Battery Pack

A fifth aspect of this application provides a battery pack. The battery pack includes the battery pack in the fourth aspect of this application. A quantity of battery modules included in the battery pack may be adjusted based on use and capacity of the battery pack.

Figure 8:
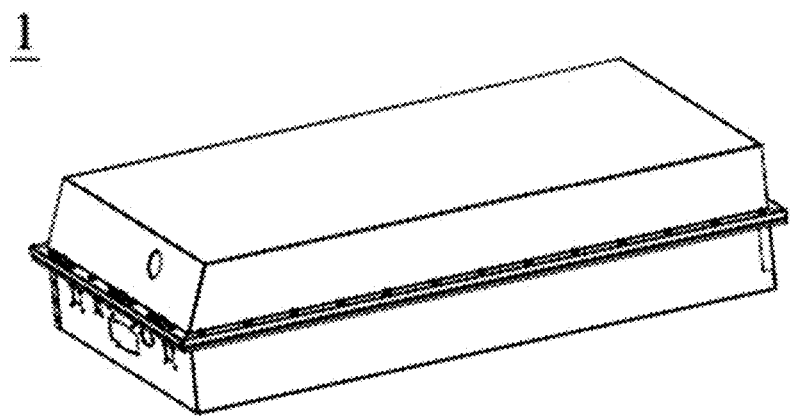
FIG. 8 is a schematic diagram of an embodiment of a battery pack.
Figure 9:
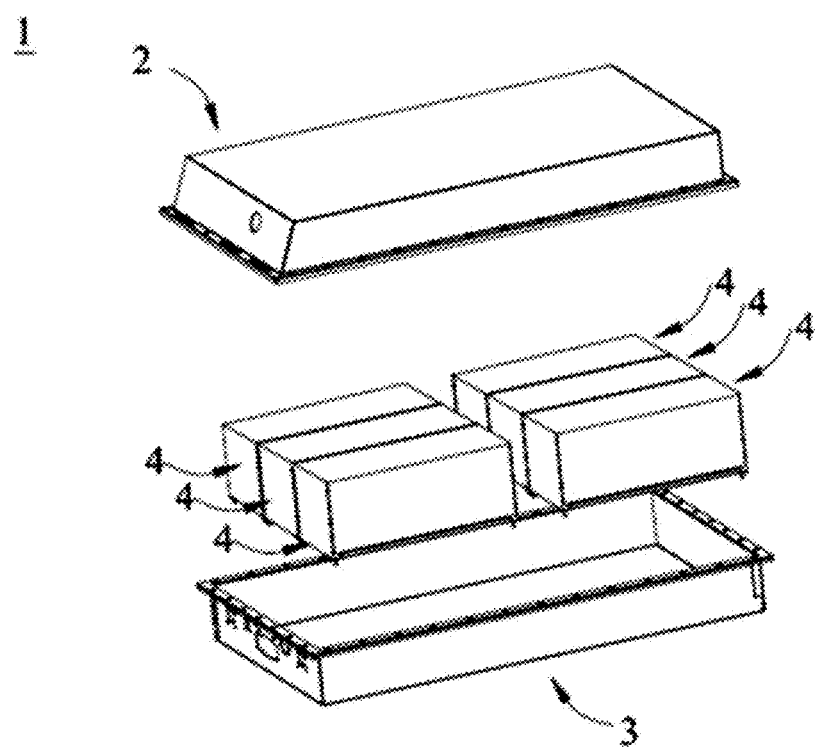
FIG. 9 is an exploded view of FIG. 8.

FIG. 8 and FIG. 9 show a battery pack 1 as an example. Referring to FIG. 8 and FIG. 9, the battery pack 1 may include a battery box and a plurality of battery modules 4 arranged in the battery box. The battery box includes an upper box body 2 and a lower box body 3. The upper box body 2 can cover the lower box body 3 to form an enclosed space for accommodating the battery modules 4. The plurality of battery modules 4 may be arranged in the battery box in any manner Apparatus A sixth aspect of this application provides an apparatus. The apparatus includes at least one of the secondary battery in the third aspect, the battery module in the fourth aspect, or the battery pack in the fifth aspect of this application. The secondary battery may be used as a power source of the apparatus or an energy storage unit of the apparatus. The apparatus in this application uses the secondary battery provided by this application, and therefore has at least the same advantages as the secondary battery.

The apparatus may be, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

A secondary battery, a battery module, or a battery pack may be selected for the apparatus according to requirements for using the apparatus.

Figure 10:
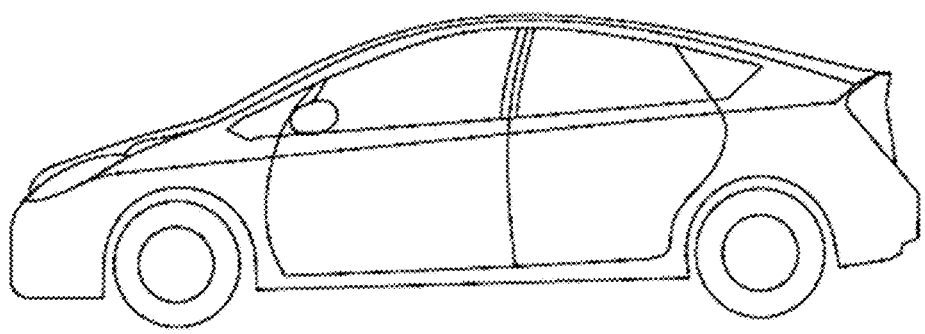
FIG. 10 is a schematic diagram of an embodiment of an apparatus using the secondary battery in this application as a power source.

FIG. 10 shows an apparatus as an example The apparatus is a battery electric vehicle, a hybrid electric vehicle, a plug-in hybrid electric vehicle, or the like. To meet requirements of the apparatus for high power and high energy density of the secondary battery, a battery pack or a battery module may be used.

In another example, the apparatus may be a mobile phone, a tablet computer, a notebook computer, or the like. Such apparatus is usually required to be light and thin, and may use a secondary battery as its power source.

The following further describes beneficial effects of this application with reference to examples.

EXAMPLES

To make the invention objectives, technical solutions, and beneficial technical effects of this application clearer, this application is further described below in detail with reference to examples. However, it should be understood that the examples of this application are merely intended to explain this application, but not to limit this application, and the examples of this application are not limited to the examples given in this specification. Examples whose experimental or operating conditions are not specified are made under conventional conditions, or under conditions recommended by the material suppliers.

Polymers used in examples and comparative examples are as following:

Polyacrylonitrile with relative molecular mass of 1000000, purchased from sigma aldrich;

Polyvinylpyrrolidone with relative molecular mass of 130000, purchased from sigma aldrich;

Polyvinyl alcohol with relative molecular mass of 900000, purchased from sigma aldrich;

Carboxymethyl cellulose with relative molecular mass of 1000000, purchased from sigma aldrich; and Polysulfuriamide with relative molecular mass of 1000000, purchased from sigma aldrich.

Method for Testing Resistivity

In this application, resistivity of a polymer film layer has a meaning well known in the art, and may be tested by using a method known in the art. An ST2253 digital four-probe tester produced by Lattice Electronics was used for the testing. Testing steps were: a compacted polymer film layer was placed into the four-probe tester so that the four-probe tester was in contact with the polymer film layer, and after resistivity data was stable, the data was read.

Method for Testing Variations of C/N and C/O in Polymer Film Layer

In this application, variations of C/N and C/O have meanings well known in the art, and may be tested by using a method known in the art. A Zeiss Gemini500 scanning electron microscopy was used to perform SEM analysis on a polymer film layer to determine concentrations of elements in the polymer film layer before and after baking. A difference value between a C/N value in the polymer film layer before baking and a C/N value in the polymer film layer after baking is the variation of C/N. A difference value between a C/O value in the polymer film layer before baking and a C/O value in the polymer film layer after baking is the variation of C/O.

Method for Testing Thickness of Polymer Film Layer

In this application, thickness of a polymer film layer has a meaning well known in the art, and may be tested by using a method known in the art. A Zeiss Gemini500 scanning electron microscopy was used to perform SEM analysis on a cross section of a polymer film layer to determine thickness of the cross section of the polymer film layer. Alternatively, a helical micrometer may be used to directly measure the thickness of the film layer.

Method for Testing Thickness of Polymer Current Collector

In this application, thickness of a polymer current collector has a meaning well known in the art, and may be tested by using a method known in the art. A Zeiss Gemini500 scanning electron microscopy was used to perform EDX analysis on a cross section of a polymer film layer to determine thickness of the cross section of the polymer film layer. Alternatively, a helical micrometer may be used to directly measure the thickness of the film layer.

for two hours. A rolling method was used to press the two films together to form a polymer current collector with a conductivity gradient.

(2) Preparation of Battery

The obtained polymer current collector with a conductivity gradient and lithium metal were assembled into a half battery, with a polymer fiber film with a lowest resistivity attached to the negative electrode and lithium metal pre-deposited in cavities of the polymer current collector. Finally, the current collector—lithium composite negative electrode was taken out of the half battery and re-matched with NCM811 to assembly a lithium metal full battery.

Examples 2 to 33 and Comparative Examples 1 to 5

Preparation methods of polymer current collectors and batteries of examples 2 to 33 and comparative examples 1 to 5 were similar to those of the polymer current collector and the battery of example 1, with the composition and product parameters of the polymer current collector changed. These different product parameters are given in Table 1.

Battery Performance Test

Test of Cycling Performance

A specific test method is as follows:

Pouch cells with an active area of 40 $cm^2$ and a design capacity of 140 mAh were tested under 0.2 C charging and discharging. The number of cycles when the capacity decayed to 80% of an initial capacity was recorded. Test results are given in Table 1.

TABLE 1-1

| | First polymer film | | Second polymer film | | First polymer film layer | | | Second polymer film layer | | | | Cycles |
|---|---|---|---|---|---|---|---|---|---|---|---|---|
| Code | Polymer | Sintering temperature (°C.) | Polymer | Sintering temperature (°C.) | Thickness (μm) | $\rho1$ ($\Omega \cdot cm$) | Variation of C/N | Thickness (μm) | $\rho2$ ($\Omega \cdot cm$) | Variation of C/N | $\rho1/\rho2$ | (capacity decayed to 80%) |
| Example 1 | Poly-acrylonitrile | 400 | Poly-acrylonitrile | 500 | 10 | 560000 | 0.6 | 10 | 6200 | 0.8 | 90.3 | 182 |
| Example 2 | | | | 600 | | | | | 860 | 1.1 | 651.2 | 185 |
| Example 3 | | | | 700 | | | | | 125 | 1.6 | 4480.0 | 190 |
| Example 4 | | | | 800 | | | | | 32 | 2.2 | 17500.0 | 192 |
| Example 5 | | | | 1000 | | | | | 10 | 4.3 | 56000.0 | 189 |
| Example 5 | Poly-acrylonitrile | 400 | Poly-acrylonitrile | 1000 | 10 | 560000 | 0.6 | 10 | 10 | 4.3 | 56000.0 | 189 |
| Example 6 | | 500 | | | | 6200 | 0.8 | | | | 620.0 | 185 |
| Example 7 | | 600 | | | | 860 | 1.1 | | | | 86.0 | 181 |
| Example 8 | | 700 | | | | 125 | 1.6 | | | | 12.5 | 179 |
| Example 9 | | 800 | | | | 32 | 2.2 | | | | 3.2 | 177 |

Example 1

(1) Preparation of Polymer Current Collector 5 g polyacrylonitrile and 1 g polyvinylpyrrolidone were dissolved in 5 ml DMF to prepare a polyacrylonitrile polymer dominant electrospinning solution. The electrospinning solution was evenly sprayed onto an aluminium foil under a high voltage of 15 kV, which formed polymer nanofiber after curing. The polymer nanofiber was peeled off the aluminum foil to obtain a polyacrylonitrile dominant polymer fiber film whose thickness was controlled around 10 μm. The same method was used to prepare two polymer fiber films. The two films were sintered at 400° C. and 500° C. respectively It can be seen from the data in Table 1-1 that under a condition that types of polymers and thicknesses of the polymer films layer remain unchanged, polymer film layers with different resistivities can be obtained by controlling sintering temperatures of the polymers. A variation of C/N also increases with increasing of the sintering temperature. A larger difference in the sintering temperatures means a larger $\rho1/\rho2$, a larger variation of C/N, and better battery cycling performance. However, when $\rho1/\rho2>60000$, because a resistivity of the first layer is too much higher than that of the second layer, a large amount of dead lithium is easily formed during release lithium metal, which deteriorates battery performance.

TABLE 1-2

| Code | First polymer film Polymer | First polymer film Sintering temperature (° C.) | Second polymer film Polymer | Second polymer film Sintering temperature (° C.) | First polymer film layer Thickness (μm) | First polymer film layer ρ1 (Ω · cm) | First polymer film layer Variation of C/N | Second polymer film layer Thickness (μm) | Second polymer film layer ρ2 (Ω · cm) | Second polymer film layer Variation of C/N | ρ1/ρ2 | Cycles (capacity decayed to 80%) |
|---|---|---|---|---|---|---|---|---|---|---|---|---|
| Example 2 | Polyacrylonitrile | 400 | Polyacrylonitrile | 600 | 10 | 560000 | 0.6 | 10 | 860 | 1.1 | 651.2 | 185 |
| Example 10 | | | | | | | | 5 | | | | 185 |
| Example 11 | | | | | | | | 50 | | | | 190 |
| Example 12 | | | | | | | | 100 | | | | 188 |
| Example 13 | | | | | | | | 500 | | | | 185 |
| Example 14 | | | | | | | | 1000 | | | | 180 |
| Example 2 | Polyacrylonitrile | 400 | Polyacrylonitrile | 600 | 10 | 560000 | 0.6 | 10 | 860 | 1.1 | 651.2 | 185 |
| Example 15 | | | | | 5 | | | | | | | 184 |
| Example 16 | | | | | 50 | | | | | | | 189 |
| Example 17 | | | | | 100 | | | | | | | 187 |
| Example 18 | | | | | 500 | | | | | | | 185 |
| Example 19 | | | | | 1000 | | | | | | | 185 |

It can be seen from the data in Table 1-2 that under a condition that types of polymers and sintering temperatures remain unchanged, thickness of the polymer is preferably 10 μm to 100 μm, which leads to better cycling performance. A film layer too thin affects strength of the current collector and is prone to cracks during battery assembly and later cycling. A film layer too thick increases weight of the current collector and also requires more electrolyte solution to infiltrate the current collector, which is not conductive to overall energy density of the battery. Further, a film too thick greatly increases a diffusion distance of lithium ions, which is not conducive to uniform deposition of lithium metal.

TABLE 1-3

| Code | First polymer film Polymer | First polymer film Sintering temperature (° C.) | Second polymer film Polymer | Second polymer film Sintering temperature (° C.) | First polymer film layer Thickness (μm) | First polymer film layer ρ1 (Ω · cm) | First polymer film layer Variation of C/N | Second polymer film layer Thickness (μm) | Second polymer film layer ρ2 (Ω · cm) | Second polymer film layer Variation of C/N | ρ1/ρ2 | Cycles (capacity decayed to 80%) |
|---|---|---|---|---|---|---|---|---|---|---|---|---|
| Example 2 | Polyacrylonitrile | 400 | Polyacrylonitrile | 600 | 10 | 560000 | 0.6 | 10 | 860 | 1.1 | 651.2 | 185 |
| Example 20 | Polyethylene oxide | | Polyethylene oxide | | | 560000 | 0.3 (C/O) | | 870 | 0.8 (C/O) | 643.7 | 189 |
| Example 21 | Polyvinyl alcohol | | Polyvinyl alcohol | | | 520000 | 0.3 (C/O) | | 820 | 0.8 (C/O) | 634.1 | 187 |
| Example 22 | Carboxymethyl cellulose | | Carboxymethyl cellulose | | | 530000 | 0.2 (C/O) | | 880 | 0.6 (C/O) | 602.3 | 188 |
| Example 23 | Polysulfuriamide | | Polysulfuriamide | | | 580000 | 0.4 | | 850 | 0.9 | 682.4 | 190 |
| Example 2 | Polyacrylonitrile | 400 | Polyacrylonitrile | 600 | 10 | 560000 | 0.6 | 10 | 860 | 1.1 | 651.2 | 185 |
| Example 24 | | | Polyethylene oxide | | | | | | 870 | 0.8 (C/O) | 643.7 | 189 |
| Example 25 | | | Polyvinyl alcohol | | | | | | 820 | 0.8 (C/O) | 682.9 | 191 |
| Example 26 | | | Carboxymethyl cellulose | | | | | | 880 | 0.6 (C/O) | 636.4 | 188 |
| Example 27 | | | Polysulfuriamide | | | | | | 850 | 0.9 | 658.8 | 191 |

It can be seen from the data in Table 1-3 that under a condition that the sintering temperatures and thicknesses of the polymer film layers remain unchanged, polymer film layers prepared through electrospinning with different types of polymers can achieve a same effect. This shows that the method of preparing a current collector with a conductivity gradient by controlling the sintering temperature is universally applicable in lithium metal batteries.

TABLE 1-4

| Code | First polymer film | | Second polymer film | | Third polymer film | | First polymer film layer | | |
|---|---|---|---|---|---|---|---|---|---|
| | Polymer | Sintering temperature (° C.) | Polymer | Sintering temperature (° C.) | Polymer | Sintering temperature (° C.) | Thickness (μm) | ρ1 (Ω·cm) | Variation of C/N |
| Example 28 | Polyacrylonitrile | 400 | Polyacrylonitrile | 600 | Polyacrylonitrile | 800 | 10 | 560000 | 0.6 |
| Example 29 | | 300 | | 500 | | 700 | | 710000000 | 0.4 |
| Example 30 | | 500 | | 700 | | 1000 | | 6200 | 0.8 |
| Example 31 | | 400 | | 700 | | 1000 | | 560000 | 0.6 |
| Example 32 | | 500 | | 600 | | 700 | | 6200 | 0.8 |

| Code | Second polymer film layer | | | Third polymer film | | | | | Cycles (capacity decayed to 80%) |
|---|---|---|---|---|---|---|---|---|---|
| | Thickness (μm) | ρ2 (Ω·cm) | Variation of C/N | Thickness (μm) | ρ3 (Ω·cm) | Variation of C/N | ρ1/ρ2 | ρ2/ρ3 | |
| Example 28 | 10 | 860 | 1.1 | 10 | 32 | 2.2 | 651.2 | 26.9 | 185 |
| Example 29 | | 6200 | 0.8 | | 125 | 1.6 | 114516.1 | 49.6 | 211 |
| Example 30 | | 125 | 1.6 | | 10 | 4.3 | 49.6 | 12.5 | 214 |
| Example 31 | | 125 | 1.6 | | 10 | 4.3 | 4480.0 | 12.5 | 218 |
| Example 32 | | 860 | 1.1 | | 125 | 1.6 | 7.2 | 6.9 | 206 |

It can be seen from the data in Table 1-4 that, under a condition that types of polymers and thicknesses of the polymer film layers remain unchanged, a polymer current collector having three polymer film layers allows for better battery performance than a polymer current collector with two polymer film layers. The reason is that the increased quantity of polymer layers allows a multi-level conductivity gradient to be formed inside the current collector, providing more driving force for lithium metal to deposit from inside to outside. This is conductive to more uniform and compact deposition of lithium metal.

TABLE 1-5

| Code | Current collector | Sintering temperature (° C.) | Thickness (μm) | Resistivity ρ1 (Ω·cm) | C/N (mass) | Cycles (capacity decayed to 80%) |
|---|---|---|---|---|---|---|
| Comparative example 1 | Polyacrylonitrile | 800 | 30 | 32 | 5.2 | 125 |
| Comparative example 2 | Polyacrylonitrile | 600 | 30 | 860 | 4.1 | 76 |
| Comparative example 3 | Polyacrylonitrile | 400 | 30 | 560000 | 3.6 | 32 |
| Comparative example 4 | Cu/Li | No | 8 | No | No | 49 |
| Comparative example 5 | Cu foil | No | 8 | No | No | 10 |

-No means not applicable.

It should be further noted that according to the disclosure and guidance in this specification, a person skilled in the art to which this application relates may also make appropriate changes and modifications to the foregoing embodiments. Therefore, this application is not limited to the specific embodiments disclosed and described above, and modifications and changes to this application also fall within the protection scope of the claims of this application. In addition, although some specific terms are used in this specification, these terms are used only for ease of description, and do not constitute any limitation on this application.

What is claimed is:

1. A polymer current collector, comprising a first polymer film layer and a second polymer film layer, a resistivity of the first polymer film layer is denoted as ρ1, a resistivity of the second polymer film layer is denoted as ρ2, ρ1 satisfies $10^3$ Ω·cm≤ρ1≤$10^6$ Ω·cm, ρ1 satisfies 10 Ω·cm≤ρ2≤1000 Ω·cm, ρ1>ρ2, a thickness of the first polymer film layer is 5 μm to 100 μm, a thickness of the second polymer film layer is 5 μm to 100 μm, and the first polymer film layer and the second polymer film layer each comprise a sintering product of a polymer precursor, and the polymer precursor is selected from the group consisting of nitrile polymer, alcohol polymer, cellulose polymer, sulfone polymer, amine polymer, ester polymer, ketone polymer, melamine foam, cotton fiber, or a combination thereof.

2. The polymer current collector according to claim 1, wherein ρ1/ρ2≥40.

3. The polymer current collector according to claim 1, wherein
in the first polymer film layer, a variation of C/N is 0.1 to 10; and
in the first polymer film layer, a variation of C/O is 0.1 to 10.

4. The polymer current collector according to claim 1, wherein
in the second polymer film layer, a variation of C/N is 0.1 to 15; and
in the second polymer film layer, a variation of C/O is 0.1 to 15.

5. The polymer current collector according to claim 1, wherein a quantity of the polymer film layers is greater than 2.

6. The polymer current collector according to claim 1, wherein the polymer current collector further comprises a third polymer film layer, the second polymer film layer is disposed between the third polymer film layer and the first polymer film layer, a resistivity of the third polymer film layer is denoted as $\rho 3$, a thickness of the third polymer film layer is 5 μm to 100 μm, and the current collector further satisfies $\rho 2 > \rho 3$.

7. The polymer current collector according to claim 6, wherein the polymer current collector further satisfies one or more of the following conditions:
   (1) $20 \leq \rho 2/\rho 3 \leq 1000$;
   (2) $1 \leq \rho 3 \leq 500$ Ω·cm;
   (3) in the third polymer film layer, a variation of C/N is 0.3 to 20; and
   (4) in the third polymer film layer, a variation of C/O is 0.3 to 20.

8. The polymer current collector according to claim 7, wherein the thickness of the third polymer film layer is 10 μm to 50 μm.

9. The polymer current collector according to claim 1, wherein the polymer current collector is a porous structure.

10. The polymer current collector according to claim 1, wherein the thickness of the first polymer film layer is 10 μm to 50 μm, and the thickness of the second polymer film layer is 10 μm to 50 μm.

11. The polymer current collector according to claim 1, wherein the polymer precursor is selected from the group consisting of polyacrylonitrile, polyvinyl alcohol, carboxymethyl cellulose, polysulfuriamide, or any combination thereof.

12. A preparation method of the polymer current collector according to claim 1, comprising the following steps:
   S1: providing two or more than two polymer films having different resistivities; and
   S2: pressing the polymer films in S1 in descending or ascending order of resistivities to obtain the polymer current collector;
   wherein the polymer current collector comprises polymer film layers, the polymer film layers comprise a first polymer film layer and a second polymer film layer, a resistivity of the first polymer film layer is denoted as $\rho 1$, a resistivity of the second polymer film layer is denoted as $\rho 2$, and the current collector satisfies $\rho 1 > \rho 2$.

13. The preparation method according to claim 12, wherein a preparation method of the polymer films comprises the following steps:
   (1) providing two or more than two polymer film precursors comprising a same polymer raw material; and
   (2) subjecting the polymer film precursors in (1) to sintering, wherein the polymer film precursors each are sintered at different temperatures to obtain polymer films having different resistivities.

14. The preparation method according to claim 13, wherein the sintering temperature is 200 degree Celsius (° C.) to 2000° C.

15. The preparation method according to claim 14, wherein the polymer raw material comprises one or more of nitrile polymer, alcohol polymer, cellulose polymer, sulfone polymer, amine polymer, ester polymer, ketone polymer, melamine foam, and cotton fiber.

16. A secondary battery, comprising a negative electrode plate, wherein the negative electrode plate comprises the polymer current collector according to claim 1.

17. The secondary battery according to claim 16, wherein the secondary battery further comprises a separator, and the first polymer film layer is closer to the separator than the second polymer film layer.

18. The secondary battery according to claim 17, wherein the secondary battery is a lithium metal secondary battery, a potassium metal secondary battery, or a sodium secondary battery.

19. An apparatus, comprising at least one of the secondary battery according to claim 16.

\* \* \* \* \*